United States Patent

[11] 3,624,757

[72] Inventors Roger Fieldhouse;
 Kenneth Thomas Eccleston, both of
 Nechells, Birmingham, England
[21] Appl. No. 864,921
[22] Filed Sept. 5, 1969
[45] Patented Nov. 30, 1971
[73] Assignee Foseco Trading A. G.
 Langenjohnstrasse, Switzerland
[32] Priority Sept. 5, 1968
[33] Great Britain
[31] 42,224/68

[54] METHOD OF LINING INGOT MOLD HEAD BOXES
 2 Claims, 2 Drawing Figs.
[52] U.S. Cl. .................................................. 164/33,
 164/161, 164/169
[51] Int. Cl. ...................................................... B22c 9/12
[50] Field of Search ............................................ 164/33,
 161, 169, 192

[56] References Cited
UNITED STATES PATENTS
2,942,319  6/1960  Anthony ...................... 164/33 X
FOREIGN PATENTS
1,210,136  2/1966  Germany ...................... 164/33
 805,592  12/1958  Great Britain ................ 164/33

Primary Examiner—J. Spencer Overholser
Assistant Examiner—John E. Roethel
Attorney—Wolfe, Hubbard, Leydig, Voit & Osann ABSTRACT: Ingot mold head boxes may be lined by inserting a first former therein, to leave an annular gap between itself and the head box, placing hot-topping composition in the gap, and by passing a second former into the gap, and thereby squeezing the hot-topping material onto and against the headbox walls. The two formers are then removed.

METHOD OF LINING INGOT MOLD HEAD BOXES

The present invention relates to the lining of ingot mold head boxes with a lining of heat-insulating or exothermic material.

BRIEF SUMMARY OF THE INVENTION

According to a first feature of the present invention there is provided a method of lining an ingot mold head box which comprises the steps of locating a head box about a first former of substantially similar external shape to the internal shape of the head box, thereby to leave an annular space between them of substantially even thickness, introducing into said annular space a quantity of lining material sufficient to give a lining of the desired thickness, and inserting into the annular spaces an annular former of internal dimensions and shape substantially the same as the external dimensions and shape of the first former, and of external shape and dimensions similar to but slightly less than those of the internal shape of the head box, thereby to deform the lining material to the shape of the annular space, setting the lining material and withdrawing the annular former and the first former.

The lining material may be any heat-insulating composition which can be deformed easily to the desired shape, i.e. which has a putty or thick pastelike consistency. Such a material is preferably of the cold-setting type, for example a heat-insulating lining composition being a foamed mixture of particulate refractory material, fibrous material, resin binder and a catalyst or accelerator to cause the mixture to set. The lining composition is preferably introduced into the annular space between the former and the head box by first placing it on top of the said first former and then displacing it therefrom into the said annular space. Such displacement may be effected by any convenient mechanical means, but it is particularly advantageous to shape the top of the former as a pyramid or cone and to employ scraper boards to displace material placed thereon into the annular space shortly before the annular former is inserted therein.

The present invention provides not only the method noted above, but also apparatus for use in carrying out that method.

According, therefore, to a further feature of the invention there is provided apparatus for lining ingot mold head boxes which comprises a first former of external shape similar to the internal shape of the head box to be lined, an annular former reciprocable over said first former, the internal shape and dimensions of which correspond to the external shape and dimensions of said first former and means for introducing a lining material into the annular space formed between said first former and a head box placed thereover. The means for introducing the lining material preferably include scraper boards adapted to displace lining material placed on the said first former into the said annular space; the upper surface of the first former is preferably constructed in the shape of a pyramid or cone.

DETAILED DESCRIPTION OF THE DRAWINGS

The invention is illustrated, by way of example, with reference to the accompanying drawings, in which.

Figure 1:
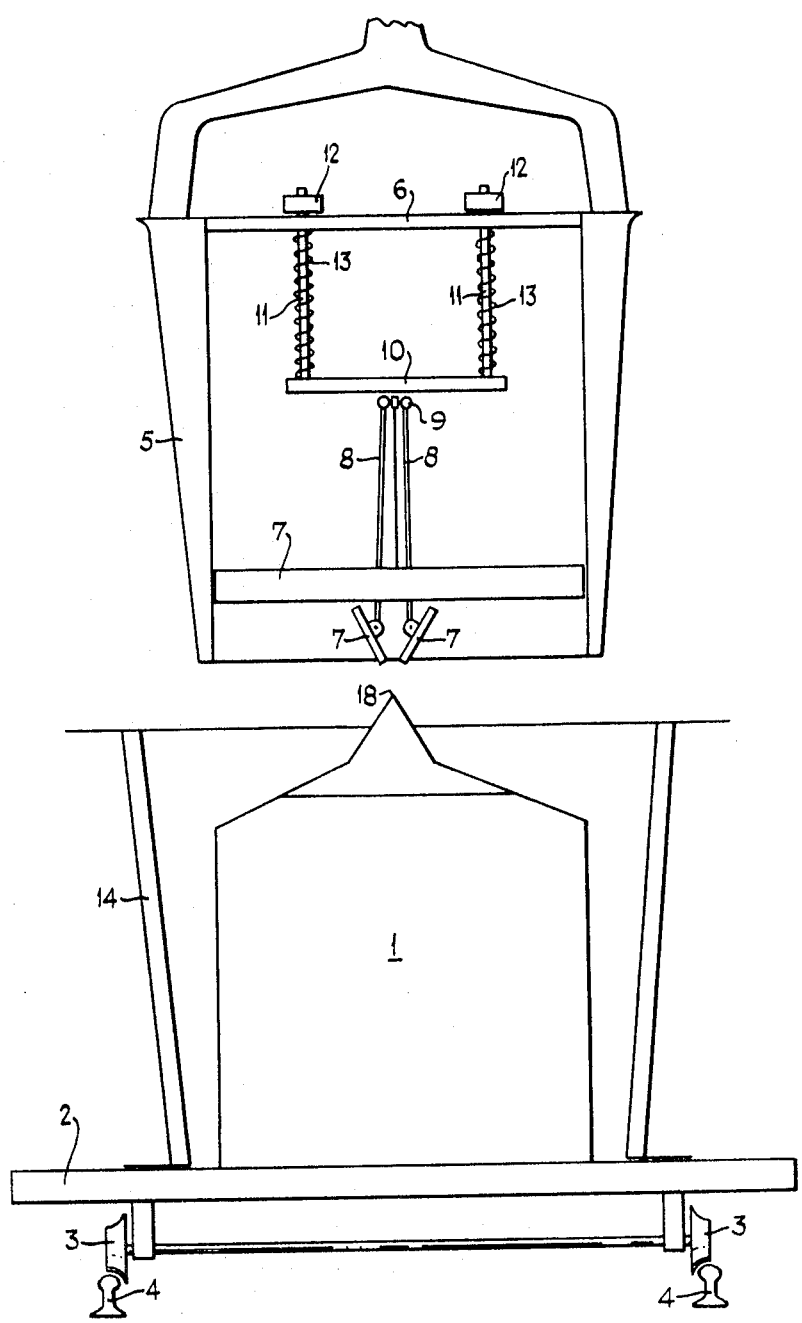
FIG. 1 is a side view, part cut away, of apparatus according to the invention.

Referring to the drawings, the apparatus consists of a former 1 mounted on a baseboard 2 which is constructed as a bogie with wheels 3 running on rails 4. Located above former 1 is an annular former 5 which may be moved up and down over former 1. Mounted within former 5 from a crossbar 6 are four scraper boards 7, each on an arm 8 pivoted at 9 on a bar 10. This bar 10 forms the base of a U-shaped member having straight parallel arms 11 slidably mounted in the crossbar 6. Stops 12 mounted on arms 11 prevent these arms 11 from escaping from crossbar 6. A spring 13 is provided on each arm 11 which urges bar 10, and thus the scraper boards 7, downwards relative to former 5. Former 5 is guided for vertical movement by any convenient means, and is preferably moveable vertically by a hydraulic or pneumatic piston/cylinder arrangement.

A head box 14 is shown in position for lining.

Figure 2:
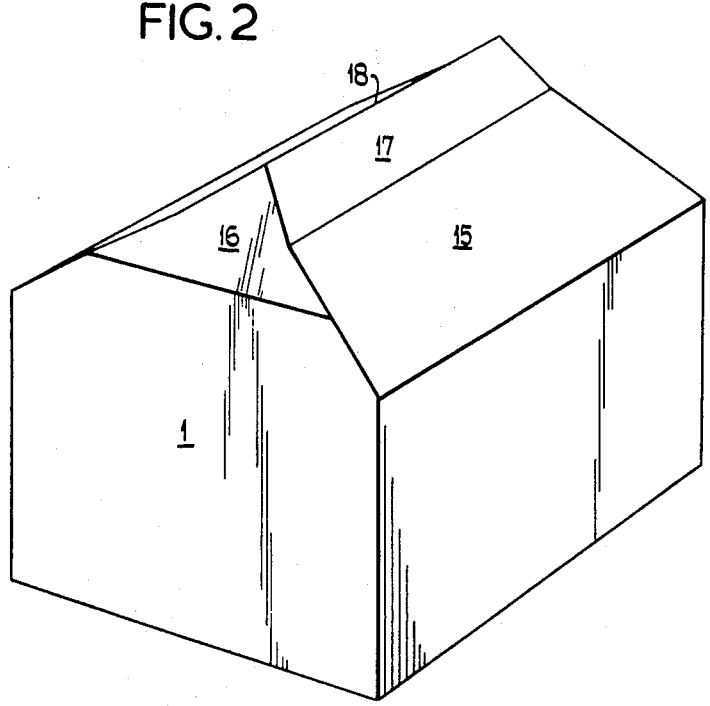
FIG. 2 is a perspective view, of a first former for use in the apparatus of FIG. 1.

Referring to FIG. 2, the former 1 is shaped with a double shallow pyramidal top having 6 flat faces, only 3 of which are clearly visible and are denoted 15, 16 and 17. The ridge is denoted 18.

In use, the head box to be lined is placed over the former 1 at a suitable station, a quantity of lining composition is deposited on top of former 1, and baseboard 2 moved to the position shown in FIG. 1. The assembly consisting of annular former 5 and the various members borne thereon is then slowly lowered. The pairs of scraper boards 7 are separated by the ridge 18 and slowly move down the upper faces of former 1 scraping such lining material as lies thereon into the annular gap between former 1 and head box 14. The position of the scraper boards may be so adjusted by adjusting the position of stops 12 on arms 11 that just as the boards 7 reach the edges of former 1, they locate against the inner walls of former 5. Former 5 is then moved downwards into the annular gap between former 1 and the head box to be lined and so deforms the lining material therein outwardly and upwardly to constitute a lining adherent to the head box. Scraper boards 7 are, during this part of the motion of former 5, stationary, and crossbar 6 slides down arms 11 against the action of springs 13. After a suitable period of time, when the lining material is set and adherent to the walls of the head box, the former 5 is withdrawn upwardly (which withdrawal may be facilitated if the former 5 is coated either with a release agent, e.g. a silicone wax or the like, or with a release coating such as of a fluorocarbon polymer), and the baseboard 2, carrying the lined head box, moved to a suitable station where removal of the head box, may be effected by any convenient means.

It may be necessary in order to provide that the lining material does not take unduly long to set, to provide means of heating the material, e.g. dielectric heating using former 5 as one electrode and the head box as the other. In addition, the head box may, prior to the introduction of the lining material, be sprayed or otherwise treated with an agent to aid in adhesion of the lining, e.g. a dispersion of polyisobutylene.

We claim as our invention:

1. In the method of lining an ingot mold head box, the steps comprising locating a head box about a first former of substantially similar external shape to the internal shape of the head box and dimensioned to leave an annular space therebetween of substantially even thickness placing a quantity of lining material sufficient to give a lining of the desired thickness on top of the first former, displacing the lining material therefrom into said annular space, inserting into the annular space an annular former of internal dimensions and shape substantially the same as the external dimensions and shape of the first former, and of external shape and dimensions similar to but slightly less than those of the internal shape of the head box to thereby deform the lining material to the shape of the annular space formed between the head box and the annular former, setting the lining material and withdrawing the annular former and the first former.

2. The method of claim 1 using a cold-setting lining material which includes the step of allowing the lining to set.

* * * * *